United States Patent
Diao (10) Patent No.: US 10,574,806 B2
(45) Date of Patent: Feb. 25, 2020

(54) MOBILE TERMINAL, METHOD AND DEVICE FOR ADDING AND SHARING CONTACT

(71) Applicant: GREE GENERAL ELECTRIC APPLIANCES, INC. OF ZHUHAI, Zhuhai, Guangdong (CN)

(72) Inventor: Linlin Diao, Guangdong (CN)

(73) Assignee: GREE ELECTRIC APPLIANCES, INC. OF ZHUHAI, Zhuhai, Guangdong (CN)

( * ) Notice: Subject to any disclaimer, the term of this patent is extended or adjusted under 35 U.S.C. 154(b) by 0 days.

(21) Appl. No.: 16/087,192

(22) PCT Filed: Nov. 21, 2016

(86) PCT No.: PCT/CN2016/106656
§ 371 (c)(1),
(2) Date: Sep. 21, 2018

(87) PCT Pub. No.: WO2017/161903
PCT Pub. Date: Sep. 28, 2017

(65) Prior Publication Data
US 2019/0124191 A1    Apr. 25, 2019

(30) Foreign Application Priority Data
Mar. 22, 2016    (CN) .......................... 2016 1 0168510

(51) Int. Cl.
H04M 1/2745    (2006.01)
H04W 4/80    (2018.01)
H04L 29/12    (2006.01)

(52) U.S. Cl.
CPC .. *H04M 1/274533* (2013.01); *H04L 61/1594* (2013.01); *H04M 1/2745* (2013.01);
(Continued)

(58) Field of Classification Search
CPC ........... H04W 4/80; H04W 4/21; H04W 4/70; H04W 4/021; H04W 4/023
See application file for complete search history.

(56) References Cited

U.S. PATENT DOCUMENTS

| | | | |
|---|---|---|---|
| 2011/0111770 | A1 | 5/2011 | Kocharlakota |
| 2011/0246512 | A1 | 10/2011 | Lubarski et al. |

(Continued)

FOREIGN PATENT DOCUMENTS

| | | | |
|---|---|---|---|
| CN | 103067478 | A | 4/2013 |
| CN | 103152462 | A | 6/2013 |

(Continued)

OTHER PUBLICATIONS

International Search Report issued in International Patent Application No. PCT/CN2016/106656, dated Jan. 25, 2017, English, 3 pages.

(Continued)

*Primary Examiner* — Diane D Mizrahi
(74) *Attorney, Agent, or Firm* — Armstrong Teasdale LLP (57) ABSTRACT

Disclosed are a mobile terminal and a method and device of adding and sharing a contact. The method for adding a contact of a mobile terminal includes that: a first mobile terminal receives first target contact information from a second mobile terminal, wherein the first target contact information is information of a contact needing to be added to the first mobile terminal, and the first target contact information is pre-stored in the second mobile terminal; and the first mobile terminal adds the first target contact information to an address book. The present disclosure solves a problem in which the manual addition of contact information to a mobile terminal is complex.

14 Claims, 4 Drawing Sheets

(52) U.S. Cl.
CPC .............. *H04M 1/274508* (2013.01); *H04M 1/274516* (2013.01); *H04W 4/80* (2018.02)

(56) References Cited

U.S. PATENT DOCUMENTS

| | | | |
|---|---|---|---|
| 2014/0120906 A1 | 5/2014 | Luo et al. | |
| 2014/0245223 A1* | 8/2014 | Park ..................... | G06F 3/0488 715/800 |
| 2015/0195228 A1 | 7/2015 | Lin et al. | |
| 2015/0332532 A1* | 11/2015 | Lee ................... | G07C 9/00563 340/5.72 |
| 2015/0348179 A1* | 12/2015 | Kamisawa ............. | G08G 1/205 705/5 |
| 2016/0036965 A1* | 2/2016 | Kim ....................... | H04W 4/70 455/411 |
| 2018/0032997 A1* | 2/2018 | Gordon ............. | G06Q 20/3224 |

FOREIGN PATENT DOCUMENTS

| | | |
|---|---|---|
| CN | 103220310 A | 7/2013 |
| CN | 103702278 A | 4/2014 |
| CN | 104540086 A | 4/2015 |
| CN | 105306541 A | 2/2016 |
| CN | 105847509 A | 8/2016 |

OTHER PUBLICATIONS

European Search Report issued in European Patent Application No. 16895248.9, dated Jul. 29, 2019, 7 pages.

\* cited by examiner

MOBILE TERMINAL, METHOD AND DEVICE FOR ADDING AND SHARING CONTACT

CROSS-REFERENCE TO RELATED APPLICATIONS

The present application is the national stage entry of International Patent Application No. PCT/CN2016/106656, filed on Nov. 21, 2016, which claims the benefit of priority to Chinese Patent Application No. 201610168510.9, filed on Mar. 22, 2016, the contents of which are hereby incorporated by reference in their entirety.

TECHNICAL FIELD

The present disclosure relates to the field of mobile terminals, and more particularly to a mobile terminal, a method and device for adding and sharing a contact.

BACKGROUND

With the development of society, social circles of people are also expanding. When they meet others, they need to exchange information with each other and add new contact information to a mobile terminal. When a new contact is added to a mobile terminal, the information of the new contact needs to be manually input, and the information of the contact often contains multiple pieces of information, such as the name, phone number and address of the contact, and multiple pieces of information need to be manually input, especially in the scenario where multiple people exchange information with each other, multiple contacts need to be added, and repeated manual input of information is more complex.

In view of the problem in the related art where the manual addition of contact information to a mobile terminal is complex, an effective solution has not been proposed yet.

SUMMARY

A main objective of the present disclosure is to provide a mobile terminal and a method and device for adding and sharing a contact, intended to solve a problem in which the manual addition of contact information to a mobile terminal is complex.

According to a first aspect of the embodiment of the present disclosure, a method for adding a contact of a mobile terminal is provided. The method includes that: a first mobile terminal receives first target contact information from a second mobile terminal, wherein the first target contact information is information of a contact needing to be added to the first mobile terminal, and the first target contact information is pre-stored in the second mobile terminal; and the first mobile terminal adds the first target contact information to an address book.

According to an example embodiment, before the first mobile terminal receives first target contact information from the second mobile terminal, the method further includes that: the first mobile terminal detects a mobile terminal within a preset distance range; and the first mobile terminal determines the second mobile terminal according to the mobile terminal within the preset distance range.

According to an example embodiment, the operation that the first mobile terminal detects the mobile terminal within the preset distance range includes that: the first mobile terminal enables a positioning technology; the first mobile terminal is positioned by the positioning technology; the first mobile terminal determines the preset distance range; and the mobile terminal is searched for within the preset distance range of the first mobile terminal.

According to an example embodiment, the operation that the first mobile terminal determines the second mobile terminal according to the mobile terminal within the preset distance range includes that: the first mobile terminal outputs prompt information, wherein the prompt information is used for prompting the mobile terminal within the preset distance range; the first mobile terminal determines a mobile terminal selected from the mobile terminal within the preset distance range; and the first mobile terminal determines the selected mobile terminal as the second mobile terminal.

According to an example embodiment, after the first mobile terminal adds the first target contact information to the address book, the method further includes that: the first mobile terminal queries whether updated first target contact information exists, wherein the updated first target contact information is contact information obtained after updating the first target contact information by the second mobile terminal; and when a query result of the first mobile terminal is that the updated first target contact information exists, the first target contact information in the address book is updated according to the updated first target contact information.

According to an example embodiment, the operation that the first mobile terminal queries whether the updated first target contact information exists includes that: the first mobile terminal queries whether the updated first target contact information exists in a server, wherein the second mobile terminal is configured to upload the updated first target contact information to the server, and the server is configured to receive and store the updated first target contact information; and the operation that the first target contact information in the address book is updated according to the updated first target contact information when the query result of the first mobile terminal is that the updated first target contact information exists includes that: the first target contact information in the address book is updated according to the updated first target contact information when a query of the first mobile terminal queries is that the updated first target contact information exists in the server.

According to an example embodiment, the operation that the first mobile terminal receives first target contact information from the second mobile terminal includes that: the first mobile terminal receives multiple first target contact information of multiple second mobile terminals, and the operation that the first mobile terminal adds the first target contact information to the address book includes that: the first mobile terminal adds the multiple first target contact information to the address book.

According to an example embodiment, the method further includes that: the first mobile terminal acquires second target contact information, wherein the second target contact information is information of a contact needing to be added to the second mobile terminal, and the second target contact information is pre-stored in the first mobile terminal; and the first mobile terminal sends the second target contact information to the second mobile terminal, in order that the second mobile terminal adds the second target contact information to an address book.

According to a second aspect of the embodiment of the present disclosure, a method for sharing a contact of a mobile terminal is provided. The method includes that: a first mobile terminal acquires target contact information, wherein the target contact information is information of a contact needing to be added to a second mobile terminal, and the target contact information is pre-stored in the first mobile terminal; and the first mobile terminal sends the target contact information to the second mobile terminal, in order that the second mobile terminal adds the target contact information to an address book.

According to an example embodiment, the operation that the first mobile terminal sends the target contact information to the second mobile terminal includes that: the first mobile terminal uploads the target contact information to a server, wherein the server is configured to store the target contact information, and the second mobile terminal is configured to acquire the target contact information from the server.

According to an example embodiment, after the first mobile terminal uploads the target contact information to a server, the method further includes that: the first mobile terminal judges whether updated target contact information is received, wherein the updated target contact information is contact information input in the first mobile terminal and obtained after updating the target contact information; and when a judging result is that the updated target contact information is received, the first mobile terminal uploads the updated target contact information to the server.

According to an example embodiment, before the first mobile terminal sends the target contact information to the second mobile terminal, the method further includes that: the first mobile terminal detects a mobile terminal within a preset distance range; and the first mobile terminal determines the second mobile terminal according to the mobile terminal within the preset distance range.

According to an example embodiment, the operation that the first mobile terminal sends the target contact information to the second mobile terminal includes that: the first mobile terminal sends the target contact information to multiple second mobile terminals, in order that the second mobile terminals add the target contact information to the address books respectively.

According to a third aspect of the embodiment of the present disclosure, a device for adding a contact of a mobile terminal is provided. The device includes: a receiving element, configured to receive, by a first mobile terminal, first target contact information from a second mobile terminal, wherein the first target contact information is information of a contact needing to be added to the first mobile terminal, and the first target contact information is pre-stored in the second mobile terminal; and an adding element, configured to add, by the first mobile terminal, the first target contact information to an address book.

According to a fourth aspect of the embodiment of the present disclosure, a device of sharing a contact of a mobile terminal is provided. The device includes: an acquiring element, configured to acquire, by a first mobile terminal, target contact information, wherein the target contact information is information of a contact needing to be added to a second mobile terminal, and the target contact information is pre-stored in the first mobile terminal; and a sending element, configured to send, by the first mobile terminal, the target contact information to the second mobile terminal, in order that the second mobile terminal adds the target contact information to an address book.

According to a fifth aspect of the embodiment of the present disclosure, a mobile terminal is provided. The mobile terminal includes the device for adding a contact of a mobile terminal of the present disclosure.

According to a sixth aspect of the embodiment of the present disclosure, a mobile terminal is provided. The mobile terminal includes the device for sharing a contact sharing apparatus of a mobile terminal of the present disclosure.

In the present disclosure, a first mobile terminal receives first target contact information from a second mobile terminal, wherein the first target contact information is information of a contact pre-input in the second mobile terminal; and the first mobile terminal adds the first target contact information to an address book. The problem in which the manual addition of contact information to a mobile terminal is complex is solved, thus achieving an effect of simplifying the operation of adding contact information to a mobile terminal.

BRIEF DESCRIPTION OF THE DRAWINGS

The drawings constituting a part of the present application are used to provide a further understanding of the present disclosure. The exemplary embodiments of the present disclosure and descriptions are used to explain the present disclosure, and do not constitute improper limitations to the present disclosure. In the drawing.

DETAILED DESCRIPTION OF THE EMBODIMENTS

It is to be noted that the embodiments in the present application and the features in the embodiments may be combined with each other without conflict. The present disclosure will be described in detail below with reference to the drawings in conjunction with the embodiments.

In order to make those skilled in the art better understand the solution of the present application, the technical solution in the embodiments of the present application will be clearly and completely described hereinbelow with reference to the drawings in the embodiments of the present application. It is apparent that the described embodiments are only a part of the embodiments of the present application, not all of the embodiments. On the basis of the embodiments of the present application, all other embodiments obtained on the premise of no creative work of general technicians in the art shall fall within the scope of protection of the present application.

It is to be noted that the specification and claims of the present application and terms "first", "second" and the like in the drawings are intended to distinguish similar objects, and do not need to describe a specific sequence or a precedence order. It should be understood that objects used in such a way may be exchanged under appropriate conditions, in order that the embodiments of the present application described here can be implemented in a sequence except sequences graphically shown or described here. In addition, terms "include" and "have" and any variations are intended to cover non-exclusive inclusions. For example, processes, methods, systems, products or devices containing a series of steps or elements do not need to clearly show those steps or elements, and may include other inherent steps or elements of these processes, methods, products or devices, which are not clearly shown.

The embodiments of the present disclosure provide a method for adding a contact of a mobile terminal.

Figure 1:
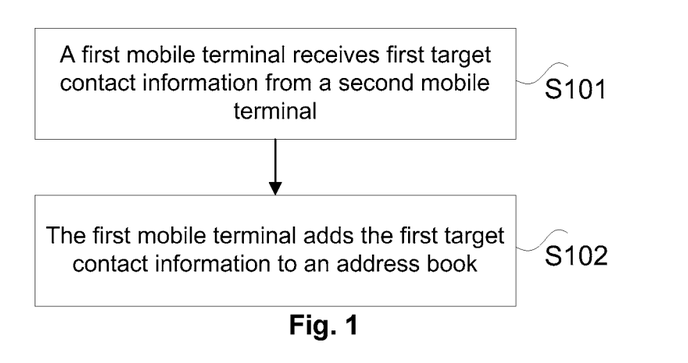
FIG. 1 is a flowchart of a method for adding a contact of a mobile terminal according to an embodiment of the present disclosure.

FIG. 1 is a flowchart of a method for adding a contact of a mobile terminal according to an embodiment of the present disclosure. As shown in FIG. 1, the method includes the steps as follows.

In step S101, a first mobile terminal receives first target contact information from a second mobile terminal.

A first mobile terminal receives first target contact information from a second mobile terminal, wherein the first target contact information is information of a contact needing to be added to the first mobile terminal, and the first target contact information is pre-stored in the second mobile terminal. The first mobile terminal and the second mobile terminal may be mobile communication terminals. In step S101, the first mobile terminal is configured to receive first target contact information, and the second mobile terminal is configured to send first target contact information.

The first target contact information may be information of a contact pre-input in the second mobile terminal, and the pre-input information of the contact may be contact information of a user using the second mobile terminal, or may be contact information of other people input in the second mobile terminal. The first target contact information may be stored in the second mobile terminal, and may also be stored in other devices, for example, stored in a server, wherein the second mobile terminal may establish a contact account in the server after receiving the contact information input by the user. The contact information uploaded by the second mobile terminal to the server is stored under the contact account. The first target contact information may include multiple pieces of information such as the name, the contact number, the mailbox, the home address, and the company address of a target contact.

The first mobile terminal may receive the second mobile terminal in a wireless transmission manner. Preferably, a short-range wireless transmission technology such as a Bluetooth technology, a Wireless Fidelity (WIFI) technology, an infrared transmission technology and a network data transmission technology may be employed. The transmission of information between mobile terminals may be realized by using the short-range wireless transmission technology without Internet, and the transmission information is more secure and reliable.

In step S102, the first mobile terminal adds the first target contact information to an address book.

After receiving the first target contact information from the second mobile terminal, the first mobile terminal adds the first target contact information to an address book. The first target contact information may be transmitted in the form of a business card, or may be transmitted in the form of a configuration file, or may be transmitted in the form of a text. The present embodiment does not limit the specific transmission mode, as long as the first mobile terminal may identify and add the information of the contact to the address book after receiving the first target contact information.

The address book may be an address book provided by a mobile communication terminal, for example, an address book of an operating system installed in the mobile communication terminal, or an address book generated by a preset application program installed in the mobile communication terminal. Multiple contacts may be stored in the address book, and each contact name may include multiple pieces of information such as the name, the mailbox, the home address, and the company address of the contact.

If the contact information which is the same as the name or the phone number of the target contact is already stored in the address book of the first mobile terminal, a user may be prompted whether to overwrite or merge the first target contact information sent by the second mobile terminal and original contact information in the first mobile terminal; if the information of the target contact is not included in the address book of the first mobile terminal, the first mobile terminal may add a new contact after receiving the first target contact information, and stores the first target contact information under the name of the new contact.

According to the method for adding the contact of a mobile terminal provided by the present embodiment, a first mobile terminal receives first target contact information from a second mobile terminal, and adds the first target contact information to an address book. The problem in which the manual addition of contact information to a mobile terminal is complex is solved, thus achieving an effect of simplifying the operation of adding contact information to a mobile terminal.

Before step S101, the present embodiment may further include that: the first mobile terminal detects a mobile terminal within a preset distance range; and the first mobile terminal determines the second mobile terminal according to the mobile terminal within the preset distance range. The preset distance range is an area within a preset range from the first mobile terminal. The operation of detecting the mobile terminal within the preset distance range may be that: the first mobile terminal searches for the mobile terminal within the preset distance range by using the short-range wireless transmission technology, at this time, the preset distance range is the maximum range that can be searched by the short-range wireless transmission technology, or, the first mobile terminal may search for the mobile terminal within the preset distance range by using a service system, wherein the service system may be configured to search for the mobile terminal within the preset distance range, and the preset distance range may be a preset distance range may be a preset distance. Specifically, the preset distance may be preset, a range from the first mobile terminal, less than the preset distance, is a preset distance range, and the service system may determine the preset distance range by obtaining a specific value of the preset distance. The specific manner in which the service system searches for the mobile terminal within the preset distance range may be that: the first mobile terminal may locate the first mobile terminal by using a positioning technology, the location of the first mobile terminal is sent to the service system, and the service system searches for the mobile terminal within the preset distance range around the first mobile terminal, and provides the found mobile terminal for the first mobile terminal, wherein the mobile terminal that can be searched by the service system may be the mobile terminal that is visible to the service system.

A preferred implementation manner of detecting, by the first mobile terminal, the mobile terminal within the preset distance range is that: the first mobile terminal enables a positioning technology; the first mobile terminal is positioned by the positioning technology; and after the first mobile terminal determines the preset distance range, the mobile terminal is searched for within the preset distance range of the first mobile terminal. The positioning technology may be a Global Positioning System (GPS) technology configured by the first mobile terminal, or may be a base station positioning technology. The preset distance range is determined may be a preset distance. The range from the first mobile terminal, less than the preset distance, is a preset distance range, or may be the maximum distance that can be searched by the positioning technology of the first mobile terminal, and may also be a longest distance within which a transmission technology adopted for transmitting the first target contact information between the first mobile terminal and the second mobile terminal. The transmission technology adopted for transmitting the first target contact information may be a short-range wireless communication transmission technology such as Bluetooth and WIFI. After the preset distance range is determined, the first mobile terminal may search for the mobile terminal within the preset distance range by using a base station, or may search for the mobile terminal within the preset distance range by using the GPS technology. Specifically, searching by using the GPS technology may be that: the first mobile terminal sends a request to a third-party service system, the location information of the first mobile terminal itself is sent to the third-party service system, the third-party service system searches for the mobile terminal within the preset distance range and prompts the mobile terminal within the preset distance range to the first mobile terminal, and the prompting manner may be: displaying the name, information, and the like of the mobile terminal within the preset distance range on an interface of the first mobile terminal, wherein the mobile terminal that can be searched by the third-party service system may be a mobile terminal pre-registered in the third-party service system. Preferably, the pre-registered mobile terminal may be searched by the third-party service system only when the third-party service system is granted the search right, and the manner that the third-party service system is granted the search permission may be that the user turns on a corresponding switch in the pre-registered mobile terminal. After searching for the mobile terminal within the preset distance range of the first mobile terminal, the first mobile terminal may determine the second mobile terminal according to the mobile terminal within the preset distance range.

The first mobile terminal may determine the second mobile terminal according to the mobile terminal within the preset distance range in the following manners. First, the first mobile terminal outputs prompt information, wherein the prompt information is used for prompting the mobile terminal within the preset distance range. For example, the name information of the mobile terminal within the preset distance range is displayed on the interface of the first mobile terminal to prompt the user to display the mobile terminal as a mobile terminal that satisfies the condition within the preset distance range. Second, after outputting the prompt information, a mobile terminal selected from the mobile terminal within the preset distance range is determined, and the user may select a mobile terminal corresponding to the first target contact information to be received on the interface of the first mobile terminal. Then, the first mobile terminal determines the selected mobile terminal as the second mobile terminal. The user may select multiple second mobile terminals in the mobile terminal within the preset distance range. When selecting the multiple second mobile terminals, the first mobile terminal may receive the first target contact information from the multiple second mobile terminals respectively.

After step S102, the present embodiment may further include that: the first mobile terminal queries whether updated first target contact information exists, wherein the updated first target contact information is contact information obtained after updating the first target contact information by the second mobile terminal; and when a query result of the first mobile terminal is that the updated first target contact information exists, the first target contact information in the address book is updated according to the updated first target contact information.

The second mobile terminal may update the first target contact information, and change, delete or add one or more pieces of information to the first target contact information according to the input of the user, wherein the first target contact information updated is the updated first target contact information. The updated first target contact information may be stored in the second mobile terminal, or may be stored in other devices, for example, stored in the server. Specifically, the second mobile terminal may synchronously upload the first target contact information to the server when updating the first target contact information, or may also upload the updated first target contact information to the server when satisfying the condition for information transmission between the second mobile terminal and the server.

The first mobile terminal may communicate with the second mobile terminal to query whether the first target contact information in the second mobile terminal is updated, or the first mobile terminal may also communicate with the server that stores the first target contact information to query whether the first target contact information is updated. When a query result is that the updated first target contact information exists, the first target contact information in the address book is updated according to the updated first target contact information, and the update manner may be direct replacement, or may be comparison of the original first target contact information with the updated first target contact information, and change, deletion and/or addition of the information under the name of an original target contact.

Preferably, the operation that the first mobile terminal queries whether the updated first target contact information exists may be that: the first mobile terminal queries whether the updated first target contact information exists in a server, wherein the second mobile terminal is configured to upload the updated first target contact information to the server, and the server is configured to receive and store the updated first target contact information; and the operation that the first target contact information in the address book is updated according to the updated first target contact information when the query result of the first mobile terminal is that the updated first target contact information exists includes that: the first target contact information in the address book is updated according to the updated first target contact information when a query of the first mobile terminal is that the updated first target contact information exists in the server.

Preferably, the first mobile terminal may not only add the contact information, but also share the contact information, for example, the first mobile terminal acquires second target contact information, and sends the second target contact information to the second mobile terminal. The second target contact information is information of a contact needing to be added to the second mobile terminal, and the second target contact information is pre-stored in the first mobile terminal, and the second mobile terminal adds the second target contact information to an address book after receiving the second target contact information.

If the first mobile terminal has a need to add a contact to the second mobile terminal, the first mobile terminal sends the second target contact information to the second mobile terminal after acquiring the second target contact information. The second target contact information is pre-stored in the first mobile terminal. The manner in which the first mobile terminal acquires the second target contact information may be that: the user directly inputs the second target contact information in the first mobile terminal, or may acquire the second target contact information stored in the first mobile terminal, or may acquire the second target contact information from another device that stores the target contact information. For example, the target contact information is acquired from a server which stores the second target contact information and may communicate with the first mobile terminal.

The manner in which the first mobile terminal sends the second target contact information to the second mobile terminal may be a wireless transmission manner. Preferably, a short-range wireless transmission technology such as a Bluetooth technology, a WIFI technology, an infrared transmission technology and a network data transmission technology may be employed.

In the above embodiment, the first mobile terminal may receive multiple first target contact information from multiple second mobile terminals, and the first mobile terminal adds the multiple first target contact information to the address book. The first mobile terminal may also send second target contact information to the multiple second mobile terminals, wherein the second mobile terminal may add the second target contact information to the address book of the second mobile terminal after receiving the second target contact information.

Figure 2:
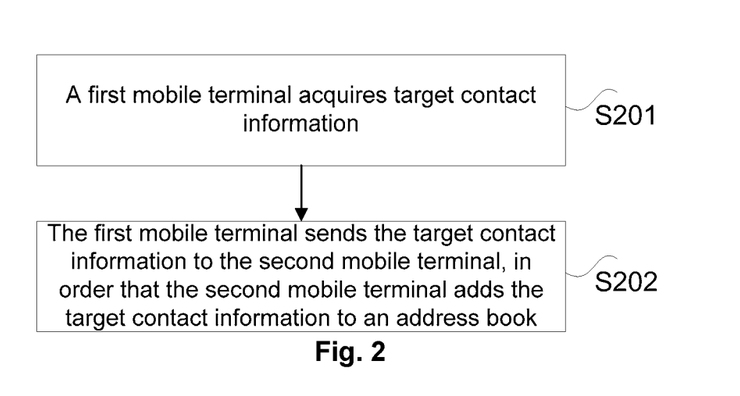
FIG. 2 is a flowchart of a method for sharing a contact of a mobile terminal according to a first embodiment of the present disclosure.

FIG. 2 is a flowchart of a method for sharing a contact of a mobile terminal according to a first embodiment of the present disclosure. As shown in FIG. 2, the method includes the steps as follows.

In step S201, a first mobile terminal acquires target contact information.

A first mobile terminal acquires target contact information. In the present embodiment, the target contact information is information of a contact needing to be added to a second mobile terminal, and the target contact information is pre-stored in the first mobile terminal. The first mobile terminal and the second mobile terminal may be mobile communication terminals. In the present embodiment, the first mobile terminal is configured to send target contact information, and the second mobile terminal is configured to receive the target contact information.

The target contact information may be information of a contact pre-input in the first mobile terminal, and the pre-input information of the contact may be contact information of a user using the first mobile terminal, or may be contact information of other people input in the first mobile terminal. The target contact information may be stored in the first mobile terminal, and may also be stored in other devices, for example, stored in a server, wherein the first mobile terminal may establish a contact account in the server after receiving the contact information input by the user. The contact information uploaded by the first mobile terminal to the server is stored under the contact account. The target contact information may include multiple pieces of information such as the name, the contact number, the mailbox, the home address, and the company address of a target contact.

The manner of acquiring the target contact information may be that: the user directly inputs the target contact information in the first mobile terminal, or may acquire the target contact information stored in the first mobile terminal, or may acquire the target contact information from another device that stores the target contact information. For example, the target contact information is acquired from a server which stores the target contact information and may communicate with the first mobile terminal.

In step S202, the first mobile terminal sends the target contact information to the second mobile terminal, in order that the second mobile terminal adds the target contact information to an address book.

After acquiring the target contact information, the first mobile terminal sends the target contact information to the second mobile terminal, and after receiving the target contact information, the second mobile terminal may add the target contact information to an address book of the second mobile terminal. The target contact information may be transmitted in the form of a business card, or may be transmitted in the form of a configuration file, or may be transmitted in the form of a text. The present embodiment does not limit the specific transmission mode of the target contact information, as long as it is a default transmission form of the first mobile terminal and the second mobile terminal. After receiving the target contact information, the second mobile terminal may identify and add the information of the contact to the address book of the second mobile terminal.

The manner in which the first mobile terminal sends second target contact information to the second mobile terminal may be a wireless transmission manner. Preferably, a short-range wireless transmission technology such as a Bluetooth technology, a WIFI technology, an infrared transmission technology and a network data transmission technology may be employed.

Preferably, the operation that the first mobile terminal sends the target contact information to the second mobile terminal includes that: the first mobile terminal uploads the target contact information to a server, wherein the server is configured to store the target contact information, and the second mobile terminal is configured to acquire the target contact information from the server. The first mobile terminal may store the contact information in the address book or the contact information input by the user into the server. Specifically, the first mobile terminal may establish a contact account in the server, upload target contact information to the server, and store the target contact information under the contact account.

Preferably, after the first mobile terminal uploads the target contact information to a server, the method further includes that: the first mobile terminal judges whether updated target contact information is received, wherein the updated target contact information is contact information input in the first mobile terminal and obtained after updating the target contact information; and when a judging result is that the updated target contact information is received, the first mobile terminal uploads the updated target contact information to the server. The second mobile terminal may query, in the server, whether the target contact information is updated, and store the updated target contact information into the address book of the second mobile terminal when a query is that the target contact information is updated, or the second mobile terminal may directly communicate with the first mobile terminal to initiate a query to the first mobile terminal to determine whether the target contact information is updated, and if the target contact information is updated, the updated target contact information sent by the first mobile terminal is received and stored into the address book.

Preferably, before the first mobile terminal sends the target contact information to the second mobile terminal, the method further includes that: the first mobile terminal detects a mobile terminal within a preset distance range; and the first mobile terminal determines the second mobile terminal according to the mobile terminal within the preset distance range.

The first mobile terminal may detect the mobile terminal within the preset distance range through a short-range wireless transmission technology, or determine the mobile terminal within the preset distance range by using a positioning technology such as GPS positioning and base station positioning. The operation that the first mobile terminal determines the second mobile terminal according to the mobile terminal within the preset distance range may be that: all mobile terminals within the preset distance range are determined as the second mobile terminal after detecting the mobile terminal within the preset distance range, wherein there may be multiple second mobile terminals, or the mobile terminal within the preset distance range may be displayed on an interface of the first mobile terminal, and the user selects the mobile terminal that needs to transmit the target contact information to the other. The mobile terminal selected by the user is determined as the second mobile terminal, wherein there may also be multiple second mobile terminals selected by the user.

Preferably, the operation that the first mobile terminal sends the target contact information to the second mobile terminal includes that: the first mobile terminal sends the target contact information to multiple second mobile terminals, in order that the second mobile terminals add the target contact information to the address book respectively. The first mobile terminal sends the target contact information to the second mobile terminal may be: sending to multiple second mobile terminals, wherein after receiving the target contact information, the multiple second mobile terminals add it to the address books respectively.

Figure 3:
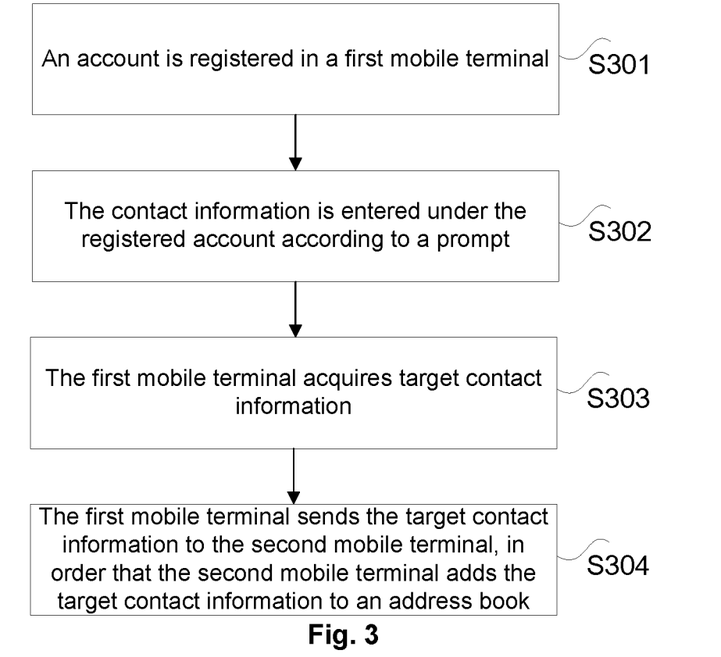
FIG. 3 is a flowchart of a method for sharing a contact of a mobile terminal according to a second embodiment of the present disclosure.

FIG. 3 is a flowchart of a method for sharing a contact of a mobile terminal according to a second embodiment of the present disclosure. The present embodiment may be used as a preferred implementation manner of the first embodiment described above. As shown in FIG. 3, the method includes the steps as follows.

In step S301, an account is registered in a first mobile terminal.

A user may register an account in a system contact module of a first mobile terminal, wherein the system contact module may be a combination of hardware and/or software of a first mobile terminal system, or may be an application installed in the first mobile terminal. The system contact module is configured to store contact information input by the user into the first mobile terminal, and send the contact information when the contact information needs to be sent.

In step S302, the contact information is entered under the registered account according to a prompt.

The first mobile terminal may prompt the user to input contact information, wherein the contact information may be contact information of the user using the first mobile terminal, or contact information of other contacts input in the first mobile terminal. Correspondingly, the registered account may store only the contact information of the user who uses the first mobile terminal, or the information of one or more contacts input in the first mobile terminal. The contact information may include the name, contact number, address, and the like of a contact.

Preferably, after the user registers an account in the system contact module and inputs contact information, the system contact module may upload and save the contact information under the account in the server. Moreover, the contact information in the system contact module of the first mobile terminal may be associated with the account of the first mobile terminal, and when the user updates the contact information in the system contact module, the contact information may be simultaneously updated in the server, in order that other mobile terminals perform query and update.

In step S303, the first mobile terminal acquires target contact information.

In the present embodiment, the target contact information is information of a contact needing to be added to the second mobile terminal, that is, information of a contact needing to be sent by the first mobile terminal. The manner in which the first mobile terminal acquires the target contact information may be that: the user directly inputs the target contact information in the first mobile terminal, or may acquire the target contact information stored in the first mobile terminal, or may acquire the target contact information from a server which stores the target contact information and may communicate with the first mobile terminal.

In step S304, the first mobile terminal sends the target contact information to the second mobile terminal, in order that the second mobile terminal adds the target contact information to the address book.

After acquiring the target contact information, the first mobile terminal sends the target contact information to the second mobile terminal, in order that the second mobile terminal adds the target contact information to the address book. The address book may be an address book provided by a mobile communication terminal, for example, an address book of an operating system installed in the mobile communication terminal, or an address book generated by a preset application program installed in the mobile communication terminal. Multiple contacts may be stored in the address book, and each contact name may include multiple pieces of information such as the name, the contact number, the mailbox, the home address, and the company address of a contact. The manner in which the first mobile terminal sends the target contact information to the second mobile terminal may be a short-range wireless transmission technology such as Bluetooth, WIFI and network data.

In the present embodiment, the contact information pre-entered by the user in the system contact module of the mobile terminal may include a name, a phone number, an address, etc. In a scenario where multiple people exchange contact information, it is necessary to add one or more contacts as a new contact, or need to send contact information to one or more mobile communication terminals, as long as the distance between mobile communication terminals of multiple users is within a certain range and GPS positioning is started. After a target mobile communication terminal needing to receive or send contact information is confirmed, the contact information pre-entered in the target mobile communication terminal may be received by a short-range wireless communication technology, or the pre-entered contact information may be transmitted to the target mobile communication terminal, wherein there may be one or more target mobile communication terminals. According to the method provided in the present embodiment, the user only needs to input the contact information once. When there is a need to share the contact information, only a simple operation step is needed, and the complex step of manual input of contact information by oneself or the other is eliminated.

Figure 4:
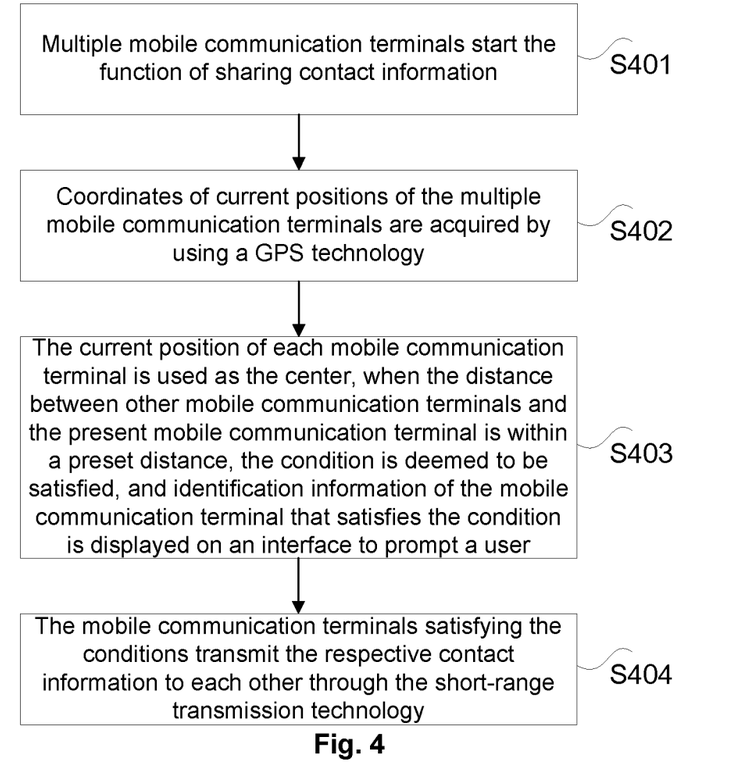
FIG. 4 is a flowchart of a method for exchanging contact information between multiple mobile terminals according to an embodiment of the present disclosure.

FIG. 4 is a flowchart of a method for exchanging contact information between multiple mobile terminals according to an embodiment of the present disclosure. As shown in FIG. 4, the method includes the steps as follows.

In step S401, multiple mobile communication terminals start the function of sharing contact information.

In a scenario where multiple contacts exchange contact information, multiple mobile communication terminals need to transmit contact information to each other. First, the function of sharing contact information is started in multiple mobile communication terminals, wherein the function of sharing contact information may be a function of the mobile communication terminal system, or a function implemented by an application installed in the mobile communication terminal. The starting mode may be to turn on a switch corresponding to the function of sharing contact information in the mobile communication terminal. After multiple mobile communication terminals start the function of sharing contact information, contact information may be shared among the multiple mobile communication terminals.

In step S402, coordinates of current positions of the multiple mobile communication terminals are acquired by using a GPS technology.

After the function of sharing contact information is respectively started by the mobile communication terminals, the respective current position coordinates may be respectively acquired by a GPS technology provided by each mobile communication terminal.

In step S403, the current position of each mobile communication terminal is used as the center, when the distance between other mobile communication terminals and the present mobile communication terminal is within a preset distance, the condition is deemed to be satisfied, and identification information of the mobile communication terminal that satisfies the condition is displayed on an interface to prompt a user.

After the function of sharing contact information is started by a mobile communication terminal, other mobile communication terminals starting the function of sharing contact information within a preset distance from the mobile communication terminal may be searched, and identification information of the other mobile communication terminals starting the function of sharing contact information within a preset distance is displayed on an interface, such as name information of the other mobile communication terminals. The operation of judging whether the distance between the mobile communication terminal and the other mobile communication terminals is within a preset distance may be judging by the function of the mobile communication terminal itself, or may be searching for other mobile communication terminals within a preset distance by base station positioning, or may be searching for other mobile communication terminals starting the function of sharing contact information within a preset distance through a third-party service system, wherein the third-party service system may obtain the current position coordinates of the mobile communication terminal and the other mobile communication terminals, a distance between the mobile communication terminal and the other mobile communication terminals is calculated respectively to judge whether the distance is less than the preset distance, and the identification information of the mobile communication terminal that satisfies the condition is displayed on the interface of the mobile communication terminal to prompt the user.

Addition of contact information between two users is taken as an example. After the first user starts the function of sharing contact information in an own mobile communication terminal, the mobile communication terminal of the first user automatically starts a GPS function, and obtains the position coordinate information of the first user. After the second user also starts the function of sharing contact information, the mobile communication terminal of the second user also automatically starts the GPS function to obtain the position coordinate information of the second user. At this time, the mobile communication terminals of the first user and the second user separately determine the distance of the position coordinates between the two users. When the distance is less than a preset distance value, it is indicated that the two mobile communication terminals satisfy the condition for transmitting contact information, and the personal contact information of the two users may be transmitted by a close-range wireless communication technology, wherein the contact information may be transmitted in the form of a business card, and the mobile communication terminal may identify the business card and add contact information contained in the business card to an address book after receiving the business card. The short-range wireless communication technology described above may be Bluetooth, WIFI, or network data, and the corresponding preset distance value is a maximum distance that can satisfy the transmission condition of the short-range wireless communication technology. The present disclosure is not limited to adding contacts to each other between two users, and contacts may be added to each other among multiple users, wherein adding contacts to each other among multiple users is also implemented by adding contacts to each other between every two users.

In step S404, the mobile communication terminals satisfying the conditions transmit the respective contact information to each other through the short-range transmission technology.

Each mobile communication terminal separately transmits the respective contact information to the mobile communication terminal satisfying the condition by the short-distance transmission technology, including transmitting the own contact information to the other and receiving the contact information sent by the other.

In the present embodiment, contact information needs to be exchanged between multiple people, that is, when new contacts are added to respective mobile communication terminals, the contact information is transmitted to each other quickly in real time. Users only need to add contact information for the first time in a system. When communicating with mobile communication terminals of other people, contact information may be directly sent to others through a short-range wireless communication technology. Others do not need to add a new contact to an address book in a manner of manually inputting multiple pieces of information. Similarly, when a user adds a new contact, others only need to send pre-entered contact information to the mobile communication terminal of the user through a transmission technology without manually inputting multiple pieces of information.

It is to be noted that the steps shown in the flowchart of the drawings may be executed in a computer system such as a set of computer executable instructions, and although the logical order is shown in the flowchart, in some cases, the steps shown or described may be performed in an order different from that herein.

The embodiments of the present disclosure also provide a device for adding a contact of a mobile terminal. It is to be noted that the device for adding the contact of the mobile terminal in the embodiments of the present disclosure may be configured to perform the method for the contact of a mobile terminal of the present disclosure.

Figure 5:
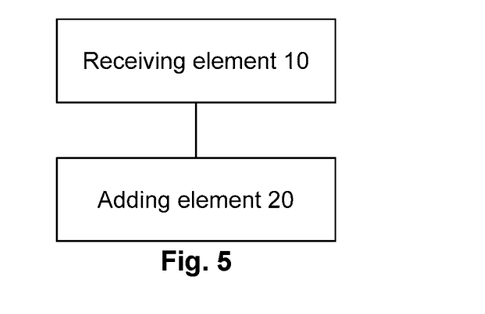
FIG. 5 is a schematic diagram of a device for adding a contact according to an embodiment of the present disclosure.

FIG. 5 is a schematic diagram of a device for adding a contact according to an embodiment of the present disclosure. As shown in FIG. 5, the apparatus includes a receiving element 10 and an adding element 20.

The receiving element 10 is configured to receive, by a first mobile terminal, first target contact information from a second mobile terminal. In the present embodiment, the first target contact information is information of a contact needing to be added to the first mobile terminal, and the first target contact information is pre-stored in the second mobile terminal. The receiving element 10 may be a wireless communication module of the first mobile terminal, and the wireless communication module may be a module using a close-range wireless communication transmission technology such as a Bluetooth module, a WIFI module and a network data transmission module.

The adding element 20 is configured to add, by the first mobile terminal, the first target contact information to an address book. The adding element 20 may be a central processing unit of the first mobile terminal.

Herein, it is to be noted that the receiving element 10 and the adding element 20 may be operated in a computer terminal as part of the devices, the functions implemented by the above modules may be performed by a processor in the computer terminal, and the computer terminal may also be a smart phone (such as an Android phone and an iOS phone), a tablet computer, a palmtop computer, and other terminal devices such as Mobile Internet Devices (MID) or a PAD.

The embodiments of the present disclosure also provide a device of sharing a contact of a mobile terminal. It is to be noted that the device of sharing the contact of the mobile terminal in the embodiments of the present disclosure may be configured to perform the contact sharing method of a mobile terminal of the present disclosure.

Figure 6:
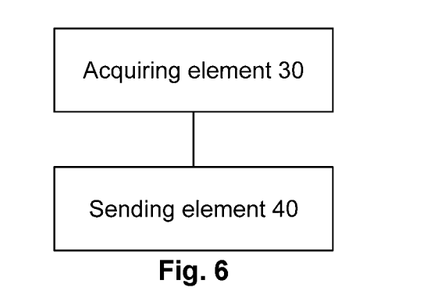
FIG. 6 is a schematic diagram of a device for sharing a contact according to an embodiment of the present disclosure.

FIG. 6 is a schematic diagram of a device of sharing a contact according to an embodiment of the present disclosure. As shown in FIG. 6, the apparatus includes an acquiring element 30 and a sending element 40.

The acquiring element 30 is configured to acquire, by a first mobile terminal, target contact information. In the present embodiment, the target contact information is information of a contact needing to be added to a second mobile terminal, and the target contact information is pre-stored in the first mobile terminal. The acquiring element 30 may be a central processing unit of the first mobile terminal, and the acquiring element 30 may acquire target contact information stored in the first mobile terminal, or may also acquire target contact information stored in a server acquire target contact information stored. The first mobile terminal may upload, after receiving target contact information input by a user, the target contact information to the server, and the first mobile terminal and the server are connected through a network.

The sending element 40 is configured to send, by the first mobile terminal, the target contact information to the second mobile terminal, in order that the second mobile terminal adds the target contact information to an address book. The sending element 40 may be a wireless communication module of the first mobile terminal, and the wireless communication module may be a module using a close-range wireless communication transmission technology such as a Bluetooth module, a WIFI module and a network data transmission module.

Herein, it is to be noted that the acquiring element 30 and the sending element 40 may be operated in a computer terminal as part of the devices, the functions implemented by the above modules may be performed by a processor in the computer terminal, and the computer terminal may also be a smart phone (such as an Android phone and an iOS phone), a tablet computer, a palmtop computer, and other terminal devices such as a MID or a PAD.

The embodiments of the present disclosure also provide a mobile terminal. The mobile terminal includes the device for adding a contact of a mobile terminal provided in the embodiments of the present disclosure.

The embodiments of the present disclosure also provide a mobile terminal. The mobile terminal includes the device for sharing a contact of a mobile terminal provided in the embodiments of the present disclosure.

Herein, it is to be noted that various functional elements provided in the embodiments of the present application may be operated in a mobile terminal, a computer terminal, or a similar calculation device, or may be stored as part of a storage medium.

Thus, the embodiments of the present disclosure may provide a computer terminal, which may be any one of computer terminal devices in a computer terminal group. Alternatively, in the present embodiment, the computer terminal may also be replaced with a terminal device such as a mobile terminal.

Alternatively, in the present embodiment, the computer terminal may be located in at least one network device among multiple network devices of a computer network.

In the present embodiment, the computer terminal may execute the program codes of the following steps in the method for adding a contact adding method of a mobile terminal: a first mobile terminal receives first target contact information from a second mobile terminal, wherein the first target contact information is information of a contact needing to be added to the first mobile terminal, and the first target contact information is pre-stored in the second mobile terminal; and the first mobile terminal adds the first target contact information to an address book.

In the present embodiment, the computer terminal may execute the program codes of the following steps in the method for sharing a contact sharing method of a mobile terminal: a first mobile terminal acquires target contact information, wherein the target contact information is information of a contact needing to be added to a second mobile terminal, and the target contact information is pre-stored in the first mobile terminal; and the first mobile terminal sends the target contact information to the second mobile terminal, in order that the second mobile terminal adds the target contact information to an address book.

Alternatively, the computer terminal may include: one or more processors, a memory, and a transmission device.

The memory may be configured to store a software program and a module, such as a program instruction/module corresponding to the method and device for adding and sharing a contact of a mobile terminal in the embodiments of the present disclosure. The processor performs various functional applications and data processing by operating the software program and the module stored in the memory to implement the above method and device for adding and sharing a contact adding and sharing method of a mobile terminal. The memory may include a high-speed random access memory, and may further include a nonvolatile memory such as one or more magnetic storage devices, flash memories or other nonvolatile solid state memories. In some examples, the memory may further include memories remote from the processor, wherein these remote memories may be connected to a terminal via a network. The network examples include, but not limited to, internet, intranet, a local area network, a mobile communication network and combinations.

The transmission device is configured to receive or transmit data via a network. The specific network examples may include a cable network and a radio network. In an example, the transmission device includes a Network Interface Controller (NIC), which may be connected with other network devices and routers via a network cable so as to communicate with the internet or local area network. In an example, the transmission device is a Radio Frequency (RF) module, configured to communicate with the internet in a radio manner.

Specifically, the memory is configured to store information about a preset action condition and a preset right user, and an application program.

The processor may call the information and the application program stored by the memory via the transmission apparatus, so as to execute program codes of the method steps in each alternative or preferred embodiment in the above-mentioned method embodiments.

Those of ordinary skill in the art may understand that the computer terminal may be a smart phone (such as an Android phone and an iOS phone), a tablet computer, a palmtop computer, and other terminal devices such as a MID or a PAD.

Those of ordinary skill in the art may understand that all or some steps in various methods of the above-mentioned embodiments may be completed by instructing relevant hardware of terminal equipment via a program, the program may be stored in a computer-readable storage medium, and the storage medium may include: a flash disk, a Read-Only Memory (ROM), a Random Access Memory (RAM), a magnetic disk or an optical disk.

The embodiments of the present disclosure also provide a storage medium. Alternatively, in the present embodiment, the storage medium may be configured to store program codes executed for the contact adding and sharing method of a mobile terminal provided in the above-mentioned method embodiments and device embodiments.

Alternatively, in the present embodiment, the storage medium may be located in any one computer terminal in a computer terminal group in a computer network, or in any one mobile terminal in a mobile terminal group.

Alternatively, in the present embodiment, the storage medium is configured to store program codes for performing the following steps that: a first mobile terminal receives first target contact information from a second mobile terminal, wherein the first target contact information is information of a contact needing to be added to the first mobile terminal, and the first target contact information is pre-stored in the second mobile terminal; and the first mobile terminal adds the first target contact information to an address book.

Alternatively, in the present embodiment, the storage medium is configured to store program codes for performing the following steps that: a first mobile terminal acquires target contact information, wherein the target contact information is information of a contact needing to be added to a second mobile terminal, and the target contact information is pre-stored in the first mobile terminal; and the first mobile terminal sends the target contact information to the second mobile terminal, in order that the second mobile terminal adds the target contact information to an address book.

Alternatively, in the present embodiment, the storage medium may also be configured to store program codes of various preferred or alternative method steps provided by the method for adding and sharing a contact of a mobile terminal.

The method and device for adding and sharing a contact of a mobile terminal according to the present disclosure are described as above in an example manner with reference to the drawings. However, Technicians in the art should understand that various improvements may also be made on the contact adding and sharing method and apparatus of a mobile terminal provided in the present disclosure without departing from the content of the present disclosure. Therefore, the scope of protection of the present disclosure should be determined by the content of the appended claims.

Obviously, Technicians in the art shall understand that all of the above-mentioned modules or steps in the present disclosure may be implemented by using a general calculation device, may be centralized on a single calculation device or may be distributed on a network composed of a plurality of calculation devices. Alternatively, they may be implemented by using executable program codes of the calculation device. Thus, they may be stored in a storage device and executed by the calculation device, or they are manufactured into each integrated circuit module respectively, or multiple modules or steps therein are manufactured into a single integrated circuit module. Thus, the present disclosure is not limited to a combination of any specific hardware and software.

The above is only the preferable embodiments of the present disclosure, and not intended to limit the present disclosure. As will occur to technicians in the art, the present disclosure is susceptible to various modifications and changes. Any modifications, equivalent replacements, improvements and the like made within the spirit and principle of the present disclosure shall fall within the scope of protection of the present disclosure.

What is claimed is:

1. A method for adding a contact of a mobile terminal, comprising:
    receiving, by a first mobile terminal, first target contact information from a second mobile terminal, wherein the first target contact information is information of a contact needing to be added to the first mobile terminal, and the first target contact information is pre-stored in the second mobile terminal; and
    adding, by the first mobile terminal, the first target contact information to an address book;
    wherein before receiving, by the first mobile terminal, the first target contact information from the second mobile terminal, the method further comprises:
    detecting, by the first mobile terminal, a mobile terminal within a preset distance range; and
    determining, by the first mobile terminal, the second mobile terminal according to the mobile terminal within the preset distance range;
    wherein determining, by the first mobile terminal, the second mobile terminal according to the mobile terminal within the preset distance range comprises:
    searching for the mobile terminal, by a service system, within the preset distance range around the second mobile terminal, providing the found mobile terminal for the second mobile terminal, wherein the mobile terminal that can be searched by the service system is the mobile terminal that is visible to the service system.

2. The method as claimed in claim 1, wherein detecting, by the first mobile terminal, the mobile terminal within the preset distance range comprises:
    enabling, by the first mobile terminal, a positioning technology;
    positioning the first mobile terminal by the positioning technology;
    determining, by the first mobile terminal, the preset distance range; and searching for the mobile terminal within the preset distance range of the first mobile terminal.

3. The method as claimed in claim 1, wherein determining, by the first mobile terminal, the second mobile terminal according to the mobile terminal within the preset distance range comprises:
   outputting, by the first mobile terminal, prompt information, wherein the prompt information is used for prompting the mobile terminal within the preset distance range;
   determining, by the first mobile terminal, a mobile terminal selected from the mobile terminal within the preset distance range; and
   determining, by the first mobile terminal, the selected mobile terminal as the second mobile terminal.

4. The method as claimed in claim 1, wherein after adding, by the first mobile terminal, the first target contact information to the address book, the method further comprises:
   querying, by the first mobile terminal, whether updated first target contact information exists, wherein the updated first target contact information is contact information obtained after updating the first target contact information by the second mobile terminal; and
   updating the first target contact information in the address book according to the updated first target contact information when a query result of the first mobile terminal is that the updated first target contact information exists.

5. The method as claimed in claim 4, wherein
   querying, by the first mobile terminal, whether the updated first target contact information exists comprises: querying, by the first mobile terminal, whether the updated first target contact information exists in a server, wherein the second mobile terminal is configured to upload the updated first target contact information to the server, and the server is configured to receive and store the updated first target contact information; and
   updating the first target contact information in the address book according to the updated first target contact information when the query result of the first mobile terminal is that the updated first target contact information exists comprises: updating the first target contact information in the address book according to the updated first target contact information when a query of the first mobile terminal is that the updated first target contact information exists in the server.

6. The method as claimed in claim 1, wherein
   receiving, by the first mobile terminal, the first target contact information from the second mobile terminal comprises: receiving, by the first mobile terminal, a plurality of first target contact information of a plurality of second mobile terminals; and
   adding, by the first mobile terminal, the first target contact information to the address book comprises: adding, by the first mobile terminal, the plurality of first target contact information to the address book.

7. The method as claimed in claim 1, further comprising:
   acquiring, by the first mobile terminal, second target contact information, wherein the second target contact information is information of a contact needing to be added to the second mobile terminal, and the second target contact information is pre-stored in the first mobile terminal; and
   sending, by the first mobile terminal, the second target contact information to the second mobile terminal, in order that the second mobile terminal adds the second target contact information to an address book.

8. A terminal for displaying a notification message, comprising:
   at least one processor; and
   a computer readable storage, coupled to the at least one processor and storing at least one computer executable instructions thereon, which when the at least one computer executable instructions is executed by the at least one processor, cause the at least one processor to carry out following actions:
   receiving, by a first mobile terminal, first target contact information from a second mobile terminal, wherein the first target contact information is information of a contact needing to be added to the first mobile terminal, and the first target contact information is pre-stored in the second mobile terminal; and
   adding, by the first mobile terminal, the first target contact information to an address book;
   wherein before receiving, by the first mobile terminal, the first target contact information from the second mobile terminal, the method further comprises:
   detecting, by the first mobile terminal, a mobile terminal within a preset distance range; and
   determining, by the first mobile terminal, the second mobile terminal according to the mobile terminal within the preset distance range;
   wherein determining, by the first mobile terminal, the second mobile terminal according to the mobile terminal within the preset distance range comprises:
   searching for the mobile terminal, by a service system, within the preset distance range around the second mobile terminal, providing the found mobile terminal for the second mobile terminal, wherein the mobile terminal that can be searched by the service system is the mobile terminal that is visible to the service system.

9. The terminal as claimed in claim 8, wherein before receiving, by the first mobile terminal, the first target contact information from the second mobile terminal, the method further comprises:
   detecting, by the first mobile terminal, a mobile terminal within a preset distance range; and
   determining, by the first mobile terminal, the second mobile terminal according to the mobile terminal within the preset distance range.

10. The terminal as claimed in claim 9, wherein detecting, by the first mobile terminal, the mobile terminal within the preset distance range comprises:
    enabling, by the first mobile terminal, a positioning technology;
    positioning the first mobile terminal by the positioning technology;
    determining, by the first mobile terminal, the preset distance range; and
    searching for the mobile terminal within the preset distance range of the first mobile terminal.

11. The terminal as claimed in claim 10, wherein determining, by the first mobile terminal, the second mobile terminal according to the mobile terminal within the preset distance range comprises:
    outputting, by the first mobile terminal, prompt information, wherein the prompt information is used for prompting the mobile terminal within the preset distance range;
    determining, by the first mobile terminal, a mobile terminal selected from the mobile terminal within the preset distance range; and determining, by the first mobile terminal, the selected mobile terminal as the second mobile terminal.

12. The terminal as claimed in claim 8, wherein after adding, by the first mobile terminal, the first target contact information to the address book, the method further comprises:
querying, by the first mobile terminal, whether updated first target contact information exists, wherein the updated first target contact information is contact information obtained after updating the first target contact information by the second mobile terminal; and
updating the first target contact information in the address book according to the updated first target contact information when a query result of the first mobile terminal is that the updated first target contact information exists.

13. The terminal as claimed in claim 12, wherein
querying, by the first mobile terminal, whether the updated first target contact information exists comprises: querying, by the first mobile terminal, whether the updated first target contact information exists in a server, wherein the second mobile terminal is configured to upload the updated first target contact information to the server, and the server is configured to receive and store the updated first target contact information; and
updating the first target contact information in the address book according to the updated first target contact information when the query result of the first mobile terminal is that the updated first target contact information exists comprises: updating the first target contact information in the address book according to the updated first target contact information when a query of the first mobile terminal is that the updated first target contact information exists in the server.

14. The terminal as claimed in claim 8, wherein
receiving, by the first mobile terminal, the first target contact information from the second mobile terminal comprises: receiving, by the first mobile terminal, a plurality of first target contact information of a plurality of second mobile terminals; and
adding, by the first mobile terminal, the first target contact information to the address book comprises: adding, by the first mobile terminal, the plurality of first target contact information to the address book.

* * * * *